United States Patent
Yakimenko et al.

(10) Patent No.: US 9,563,964 B1
(45) Date of Patent: Feb. 7, 2017

(54) METHOD AND APPARATUS FOR COMPUTER VISION ANALYSIS OF CANNON-LAUNCHED ARTILLERY VIDEO

(71) Applicant: The United States of America, as represented by the Secretary of the Navy, Washington, DC (US)

(72) Inventors: Oleg A. Yakimenko, Seaside, CA (US); Mathias N. Kolsch, Carmel, CA (US); Ryan J. Decker, Hoboken, NJ (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 286 days.

(21) Appl. No.: 14/555,798

(22) Filed: Nov. 28, 2014

Related U.S. Application Data (60) Provisional application No. 61/910,711, filed on Dec. 2, 2013.

(51) Int. Cl.
| | |
|---|---|
| *H04N 7/18* | (2006.01) |
| *G06T 7/20* | (2006.01) |
| *G06T 7/00* | (2006.01) |
| *H04N 5/77* | (2006.01) |
| *G01C 23/00* | (2006.01) |

(52) U.S. Cl.
CPC ............ *G06T 7/20* (2013.01); *G01C 23/00* (2013.01); *G06T 7/0051* (2013.01); *G06T 7/0081* (2013.01); *H04N 5/77* (2013.01); *G06T 2207/30212* (2013.01)

(58) Field of Classification Search
CPC ......... F41G 3/16; F41G 3/142; G02B 27/0068
See application file for complete search history.

(56) References Cited

PUBLICATIONS

Canny, J., "A Computational Approach to Edge Detection," IEEE Transactions on Pattern Analysis and Machine Intelligence, vol. 8, Issue 6, Jan. 2009, pp. 679-698.

Cooley, J.W., Tukey, J.W., "An Algorithm for the Machine Calculation of Complex Fourier Series," Mathematics of Computation, vol. 19, 1965, pp. 297-301.

Hough, P.V.C., "Machine Analysis of Bubble Chamber Pictures," in Proceedings of the 2nd International Conference on High-Energy Accelerators (HEACC 59), Geneva, Switzerland, Sep. 14-19, 1959, pp. 554-556.

(Continued)

*Primary Examiner* — Thai Tran
*Assistant Examiner* — Jose Mesa
(74) *Attorney, Agent, or Firm* — Naval Postgraduate School; Lisa A. Norris (57) ABSTRACT

An automated method to quantify the pitching and yawing motion of a projectile during ballistic flight using two camera/tracker video systems. Image processing tools are used to segment the shape of the projectile in each frame of a launch video, which allows the location and observed pitch angle to be calculated with sub-pixel accuracy. Subsequent automated analysis uses the history of the projectile location and the pitching behavior to calculate estimates for the epicyclic motion, as well as other ballistic parameters such as aeroballistic coefficients. Using two cameras located at different orthographic views of the line-of-fire (LOF) allows the pitching and yawing motion history of the projectile to be calculated in three dimensions (3D). In addition, input of the camera locations, cannon trunnion location, and the cannon pointing direction allows for automatic correction for camera misalignment.

2 Claims, 12 Drawing Sheets

(56) References Cited

PUBLICATIONS

Decker, R.J., Kolsch, M.N., and Yakimenko, O.A., "A Computer Vision Approach to Automatically Measure the Initial Spin-Rate of Artillery Projectiles Painted With Stripes," ASTM Journal of Testing and Evaluation, vol. 42, No. 4, 2014, pp. 1-14.

Decker, R.J., Kolsch, M.N., and Yakimenko, O.A., "An Automated Method for Computer Vision Analysis of Cannon-Launched Artillery Video," in Proceedings of the 27th International Ballistics Symposium, Freiburg, Germany, Apr. 22-26, 2013, pp. 263-274.

Decker, R.J., Kolsch, M.N., and Yakimenko, O.A., "An Automated Method for Computer Vision Analysis of Cannon-Launched Projectile Video," ASTM Journal of Testing and Evaluation, vol. 42, No. 5, 2014, pp. 1-9.

Tate, J., Extraction of Aeroballistic Coefficients from Flight Follower Data. Ballistic Consulting Ltd., 2011, pp. 1-36.

Cootes, T.F. Taylor, C.J., Cooper, D.H., and Graham, J., "Active Shape Models—Their Training and Application," Computer Vision and Image Understanding, vol. 61 , Issue 1, Jan. 1995, pp. 38-59.

"Detecting a Cell Using Image Segmentation." The MathWorks, Inc., Natick, MA, 2005, pp. 1-4.

| Pixels Along Length of Projectile | 413 | | 341 | | 227 | | 112 | | 53 | |
|---|---|---|---|---|---|---|---|---|---|---|
| Scale Ratio (vs. Typical Real Video) | 121% | | 100% | | 67% | | 33% | | 16% | |
| | True: ω (hz) | ω (hz) | % error | ω (hz) | % error | ω (hz) | % error | ω (hz) | % error | ω (hz) | % error |
| nutation ($\omega_f$) | 0.63611 | 0.63603 | -0.013% | 0.63595 | -0.025% | 0.63622 | 0.017% | 0.63600 | -0.017% | 0.46770 | -26.475% |
| precession ($\omega_s$) | 0.15000 | 0.15000 | 0.000% | 0.15002 | 0.013% | 0.14997 | -0.020% | 0.15006 | 0.040% | 0.00021 | -99.860% |

METHOD AND APPARATUS FOR COMPUTER VISION ANALYSIS OF CANNON-LAUNCHED ARTILLERY VIDEO

CROSS-REFERENCE TO RELATED APPLICATIONS

This application claims the benefit of U.S. Provisional Application No. 61/910,711 filed Dec. 2, 2013, which is hereby incorporated in its entirety by reference.

BACKGROUND OF THE INVENTION

1. Field of the Invention

The present invention generally relates to automatic determination of the pitch and the yaw of a launched projectile from recorded launch video taken of the projectile in flight.

2. Description of the Related Art

Live-fire testing of artillery projectiles is commonly conducted for design changes or lot-acceptance verification. In these tests, it is becoming increasingly common to record high-speed video of the projectiles as they exit the muzzle of the cannon. Often, these cameras are stationary digital cameras capable of recording up to 100,000 frames per second (fps). In some instances, when visual confirmation of the initial flight performance is desired, new state-of-the-art camera systems capable of automated rotating to follow a projectile are used.

Some of these camera systems utilize an optical system that works by rotating a mirror at a calculated rate, so that the projectile remains in the camera field of view for more than 100 m (meters) following muzzle exit. For example, a successful "track" of a 155 mm (millimeter)-type artillery projectile can deliver thousands of high-resolution digital images of the projectile during the first few moments of free-flight. Depending on the zoom and position of the camera, the resolution quality of these images can deliver hundreds of pixels along the length of the projectile. Analysis of this large amount of data can be difficult and time consuming, when trying to determine the position and motion of the projectile.

Manual analysis requires manual data reduction of stationary video system launch video in which an operator plays a launch video and identifies relative angles between the background and regions of the bullet to estimate position. Limitations of this type of analysis are that it is labor-intensive, limited to the precision of the image resolution, and it is subject to human error. In addition, a stationary field of view makes it difficult to measure the observed pitch angle in more than one location along the line of fire. Typically, pitch and yaw high speed cameras are pointed at an estimated location of the first-maximum yaw (FMY). This type of analysis requires precise knowledge of both the location and orientation of all cameras used.

More recent prior art methods utilize computer analysis of projectiles by tracking specific features on objects in artillery launch video. Results from different cameras can be combined to quantify 6 degrees-of-freedom (DOF) motion. Some limitations of this type of analysis are that it requires the operator to be trained in the specific program, and often requires user interaction to re-select tracked points several times during the video. These systems may not be practical if analyzing hundreds of video frames worth of data.

SUMMARY OF THE INVENTION

In accordance with one embodiment of the invention, a method for computer vision analysis of video taken of a marked projectile launched from a gun includes: receiving a first projectile launch video recording of a marked projectile launched from a gun generated by a first video camera system, the first projectile launch video having a plurality of first image frames, at least a portion of the plurality of first image frames containing a projectile shape corresponding with the marked projectile; receiving a second projectile launch video recording of the marked projectile launched from the gun generated by a second video camera system, the second video camera system being positioned at a different location from the first video camera system, the second projectile launch video having a plurality of second image frames, at least a portion of the plurality of second image frames containing a projectile shape corresponding with the marked projectile; segmenting a projectile shape, if any, in each of the first image frames of the plurality of first image frames, and generating a first pitch history; segmenting a projectile shape, if any, in each of the second image frames of the plurality of second image frames, and generating a second pitch history; receiving first mirror rotation data corresponding with the first projectile launch video recording, correcting the first pitch history for skew angle and camera misalignment, and generating a first corrected pitch history; receiving second mirror rotation data corresponding with the second projectile launch video recording, correcting the second pitch history for skew angle and camera misalignment, and generating a second corrected pitch history; receiving the first corrected pitch history and the second corrected pitch history and geodetic information associated with the location geometry of the first video camera system, the second video camera system, and the gun, and determining the pitch and the yaw of the projectile based on the first corrected pitch history, the second corrected pitch history, and the geodetic information; and outputting the pitch and the yaw of the projectile.

Embodiments in accordance with the invention are best understood by reference to the following detailed description when read in conjunction with the accompanying drawings.

BRIEF DESCRIPTION OF THE DRAWINGS

FIG. 2, illustrated in partial views FIG. 2A and FIG. 2B, illustrates a process flow diagram of a method for segmenting a projectile shape in a video frame in an operation of the method of FIG. 1 and in accordance with one embodiment of the invention.

Embodiments in accordance with the invention are further described herein with reference to the drawings.

DETAILED DESCRIPTION OF THE INVENTION

Generally viewed, embodiments in accordance with the invention provide an automated method to quantify the pitching and yawing motion of a projectile during ballistic flight using two trajectory tracking launch video camera systems. Image processing tools are used to segment the shape of the projectile in each frame of a launch video, which allows the location and observed pitch angle to be calculated with sub-pixel accuracy, with output of a determined pitch and yaw of the projectile. Subsequent automated analysis uses the history of the projectile location and the pitching behavior to calculate estimates for the epicyclic motion, as well as other ballistic parameters such as aeroballistic coefficients. Using two cameras located at different orthographic views of the line-of-fire (LOF) allows the pitching and yawing motion history of the projectile to be calculated in three dimensions (3D). In addition, input of the camera locations, cannon trunnion location, and the cannon pointing direction allow for automatic correction for camera misalignment. Herein the terms cannon and gun are used interchangeably to represent a device that launches the projectile into flight.

Figures 1, 1A:
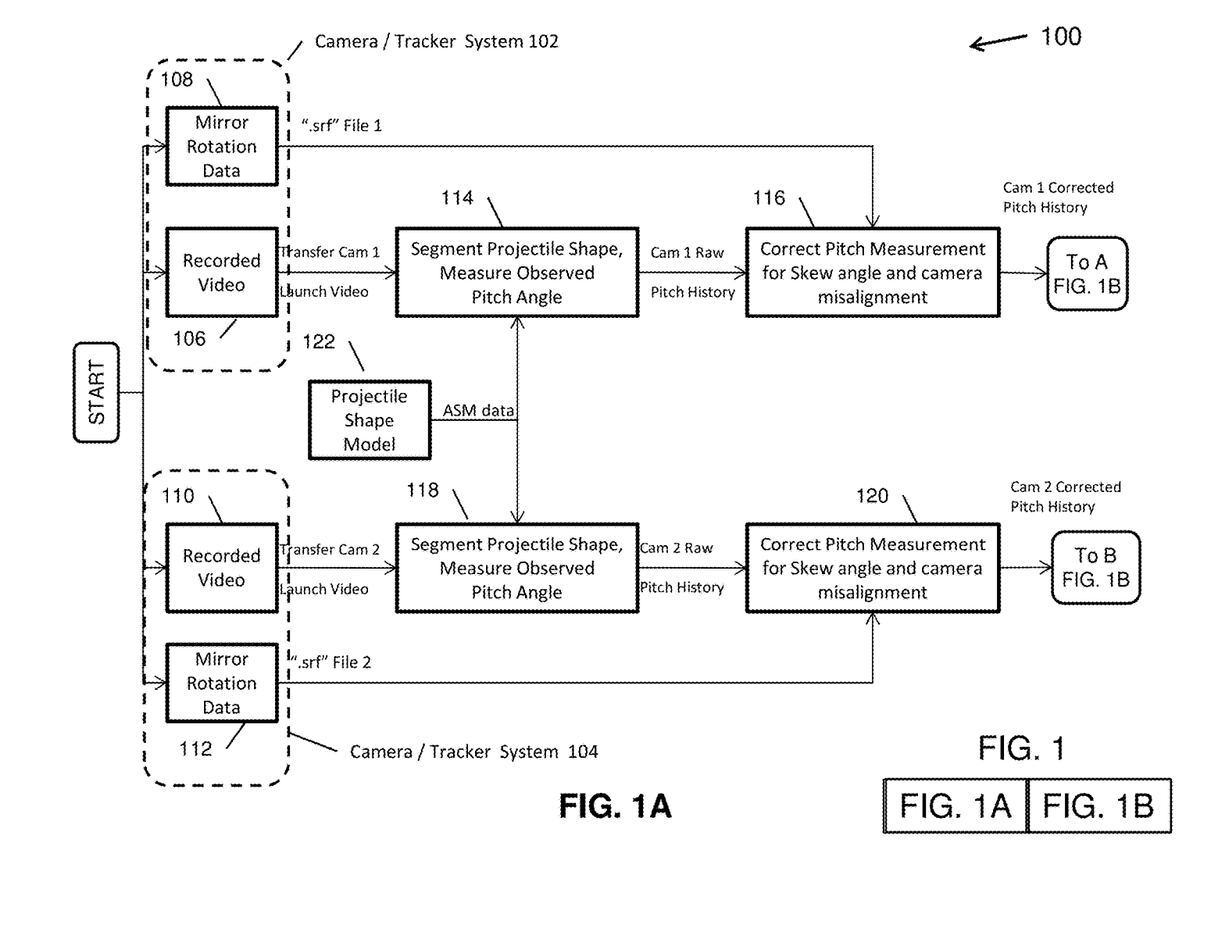
FIG. 1 is illustrated in partial views FIG. 1A and FIG. 1B and illustrates a process flow diagram of a method for computer vision analysis of cannon-launched artillery video in accordance with one embodiment of the invention.

FIG. 1 illustrates an overview of the method for computer vision analysis of cannon-launched artillery video in accordance with one embodiment of the invention.

Referring now to FIG. 1, and in particular partial view FIG. 1A, in one embodiment the method receives launch video of a projectile from each of two camera/tracker systems 102 and 104. During recording of a projectile launch, system 102 generates recorded launch video 106 and mirror rotation data 108; system 104 generates recorded launch video 110 and mirror rotation data 112. In one embodiment, recorded launch video 106, 110 and mirror rotation data 108,112 are received in a digital format.

In one embodiment recorded launch video 106 is input to a projectile segmentation process 114 and recorded launch video 110 is input to a projectile segmentation process 118 in which information from each launch video, 106, 110, such as the projectile location and orientation in each image frame, is extracted utilizing a segmentation process. In one embodiment, process 114 and process 118 utilize the same segmentation process. During segmentation process 114/118, Active Shape Model (ASM) data 122 is used in determining the projectile shape.

Figure 1B:
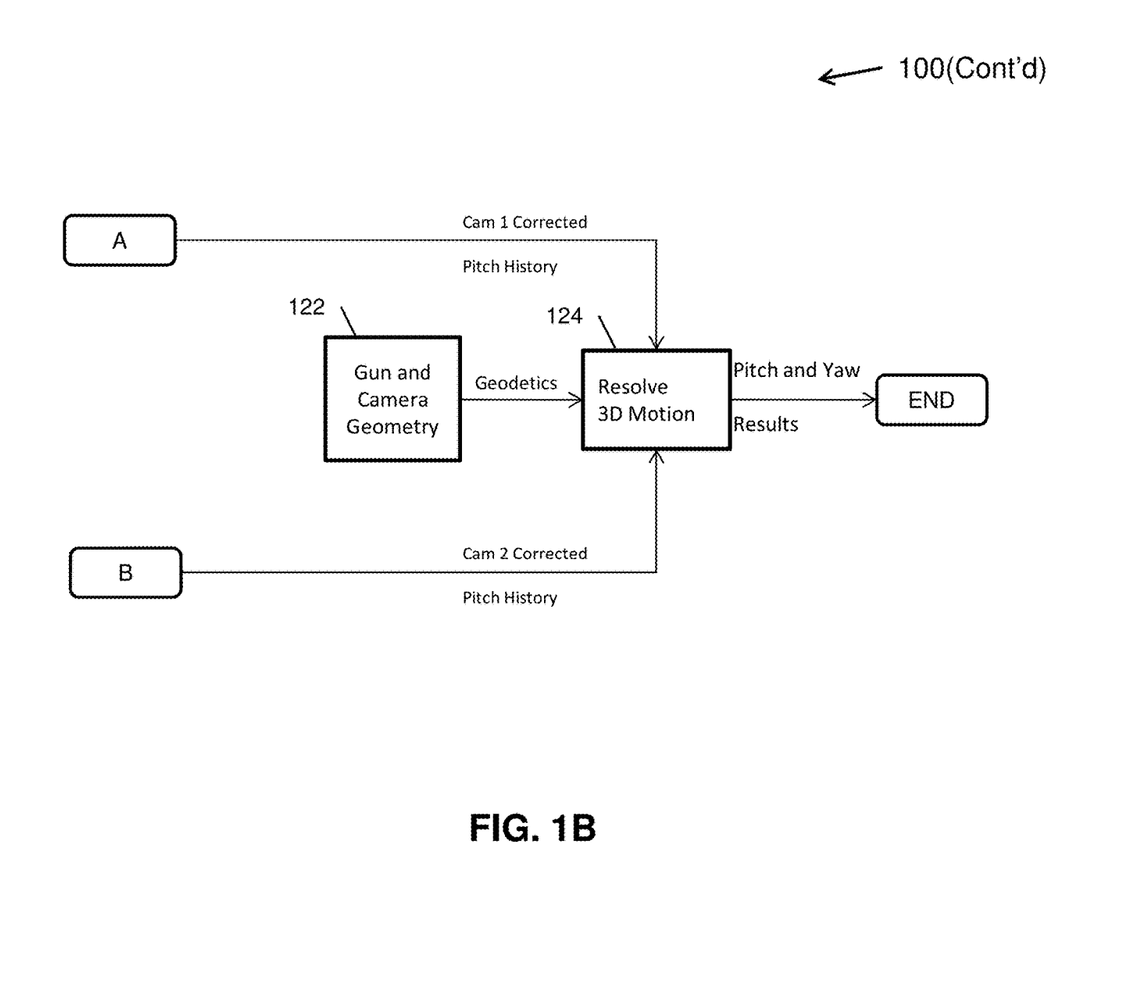

Next the extracted information from each launch video and mirror rotation data from each camera system are input to sequential post processing operations of the translational movement, analysis and correction of the observed pitching angle relative to the horizontal axis of the frame ($\Phi_{obs}$), and quantification of the corrected epicyclic motion. For example, information extracted from launch video 106 in segmentation operation 114 and mirror rotation data 108 are input to post-processing operation 116 to correct pitch measurement for skew angle and camera misalignment. Similarly, information extracted from launch video 110 in segmentation operation 118 and mirror rotation data 112 is input to post-processing operation 120 to correct pitch measurement for skew angle and camera misalignment. Referring to partial view FIG. 1B, the outputs from operation 118 and operation 120 are input to operation 124 together with gun and camera geometry information 122 to resolve the three-dimensional (3D) motion of the projectile with resultant outputs of the projectile motion, i.e., pitch and yaw results.

Figures 2, 2A:
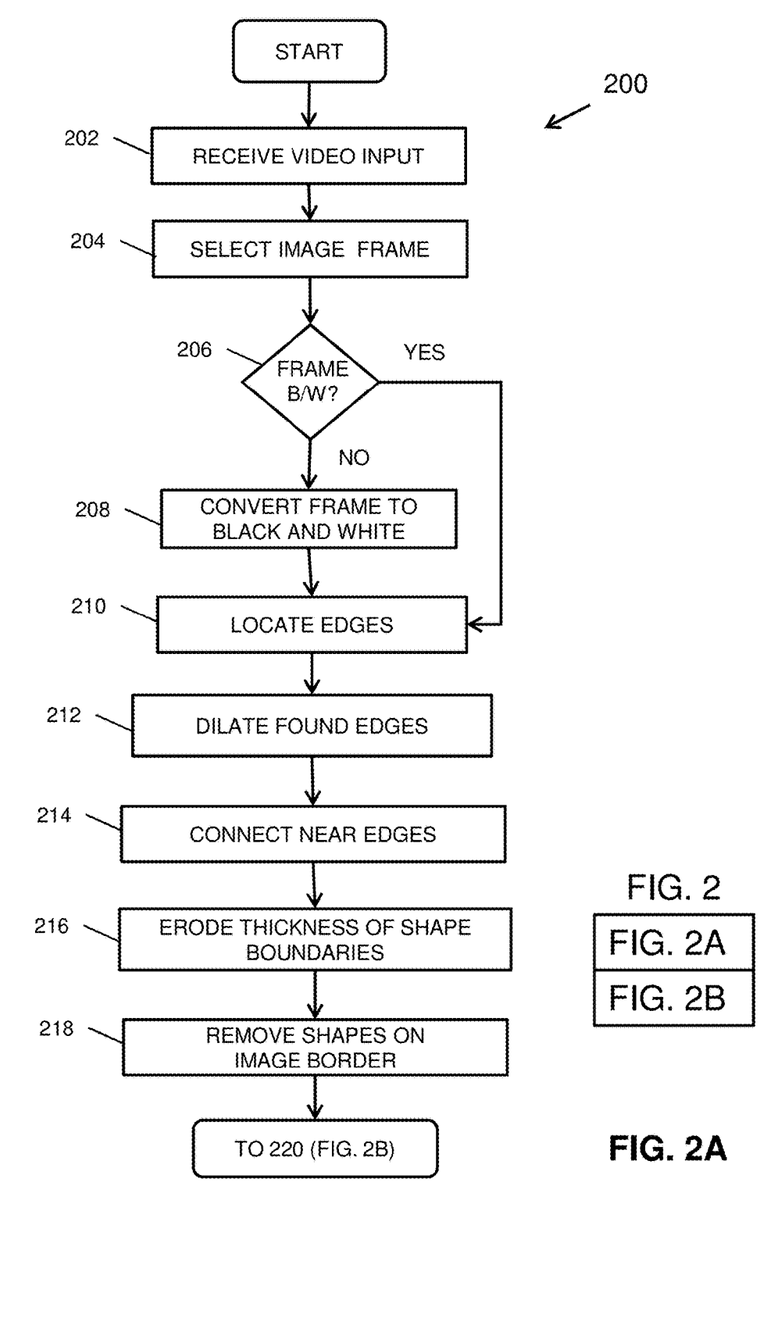
Figure 2B:
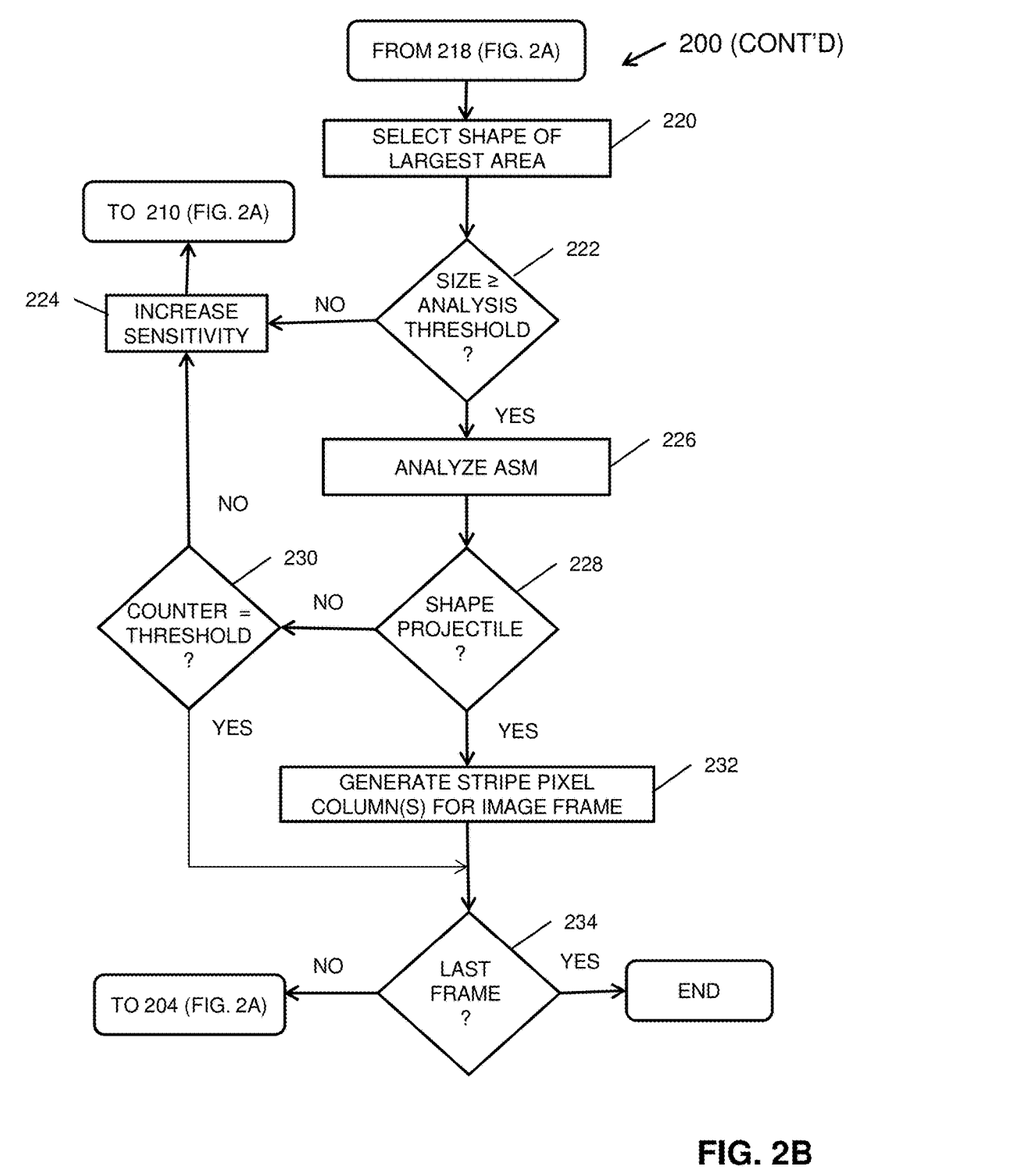

FIG. 2, illustrated in partial views FIG. 2A and FIG. 2B, illustrates a process flow diagram of a method 200 for segmenting a projectile shape in a video frame in accordance with one embodiment of the invention. In one embodiment, method 200 is used for segmenting a projectile shape, if any, in each video frame of a received launch video 106 in operation 114 and of a received launch video 110 operation 118 of method 100 (FIG. 1).

The following details are described with reference to the method of operation 114 for ease of description but are equally applicable to operation 118. Referring now to FIGS. 1 and 2, together, in operation 202, a video input is received. For example, video 106 is received at operation 114. In one embodiment video 106 includes a plurality of sequential video frames taken of a projectile launch. In operation 204 an initial video frame is selected for segmentation. In one embodiment, each video frame includes information such as time, frame number, and the video frame rate. In one embodiment, optical character recognition is used to read selected information such as the time, frame number, and the video frame rate on each video frame.

In decision operation 206 a determination is made whether the selected video frame is a black and white video frame. When a selected video frame is not black and white ("NO"), in operation 208, the video frame is converted to a black and white video frame, e.g., converted from color to grayscale. Alternatively, at operation 206, when a selected video frame is a black and white video frame ("YES"), processing continues to operation 210.

In operations 210-218 smoothing operations are applied to suppress noise in the video frame image. Edge detection techniques with variable sensitivity are combined with morphological operations to identify candidate projectile shapes in the image. Candidate shapes in contact with the image border are removed. This process is illustrated in FIGS. 3-8.

Figure 3:
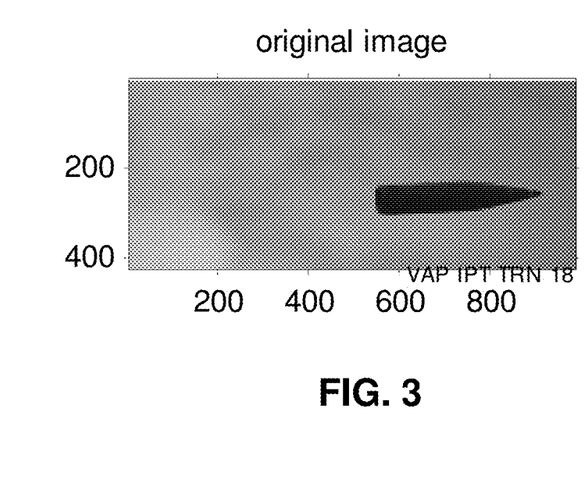
FIG. 3 illustrates an original image of a projectile in an image frame of a launch video.
Figure 4:
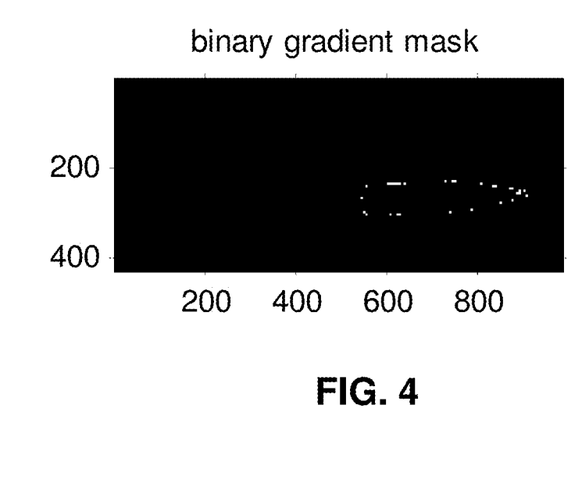
FIG. 4 illustrates an initial binary image with found edges generated from the image of FIG. 3 in accordance with one embodiment of the invention.

FIG. 3 illustrates an original image of a projectile in an image frame of a launch video. In operation 210 edges of shapes are located, also termed herein found, in the image frame. FIG. 4 illustrates an initial binary image with found edges generated from the image of FIG. 3 in accordance with one embodiment.

Figure 5:
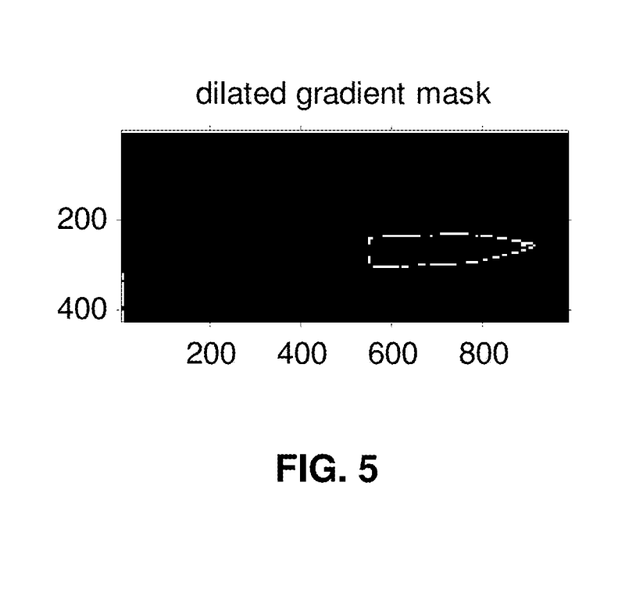
FIG. 5 illustrates a binary image after dilation of found edges in the binary image of FIG. 4 in accordance with one embodiment of the invention.

In operation 212 the found edges are dilated. FIG. 5 illustrates a binary image after dilation of found edges in the binary image of FIG. 4 in accordance with one embodiment.

Figure 6:
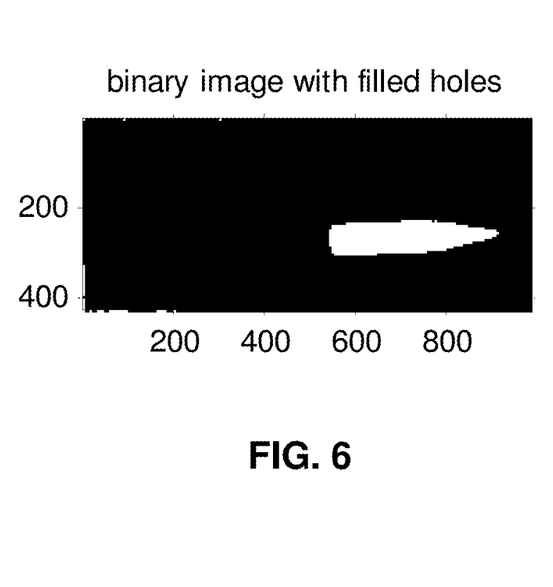
FIG. 6 illustrates a binary image after filling of holes in the binary image of FIG. 5 in accordance with one embodiment of the invention.

In operation 214 near edges of the dilated found edges are connected to form shape boundaries. FIG. 6 illustrates a binary image after filling of holes in the binary image of FIG. 5 in accordance with one embodiment.

Figure 7:
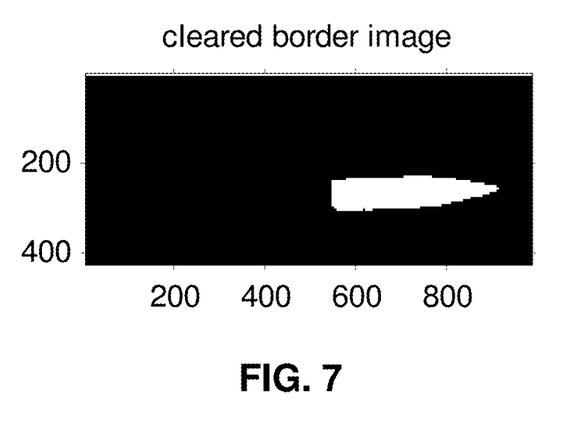
FIG. 7 illustrates a binary image after clearing the border of the binary image of FIG. 6 in accordance with one embodiment of the invention.

In operation 216 the thickness of the shape boundaries are eroded to clear the image. FIG. 7 illustrates a binary image after clearing the border of the binary image of FIG. 6 in accordance with one embodiment.

Figure 8:
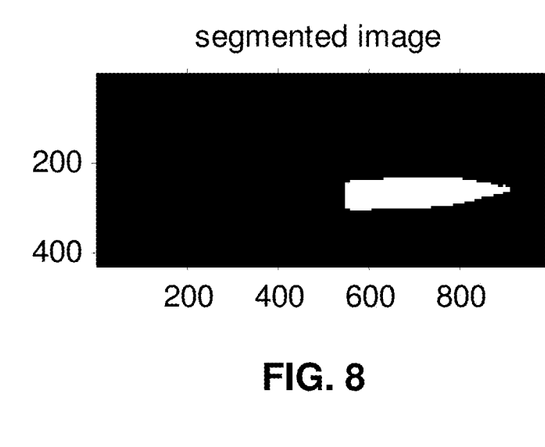
FIG. 8 illustrates a resultant segmented binary image in accordance with one embodiment of the invention.

In operation 218 shapes on the image border are removed. FIG. 8 illustrates a resultant segmented binary image in accordance with one embodiment.

Referring now to partial view FIG. 2B, in operation 220, the shape with the largest area in the image is selected for processing. In decision operation 222 the size of the shape is compared to a sized based analysis threshold to determine whether the size of the shape is greater than or equal to the analysis threshold. In one embodiment, when the size of the shape is less than the analysis threshold ("NO"), the shape is determined not large enough for further processing and processing continues to operation 224 in which the sensitivity of the video image is increased.

Figure 9:
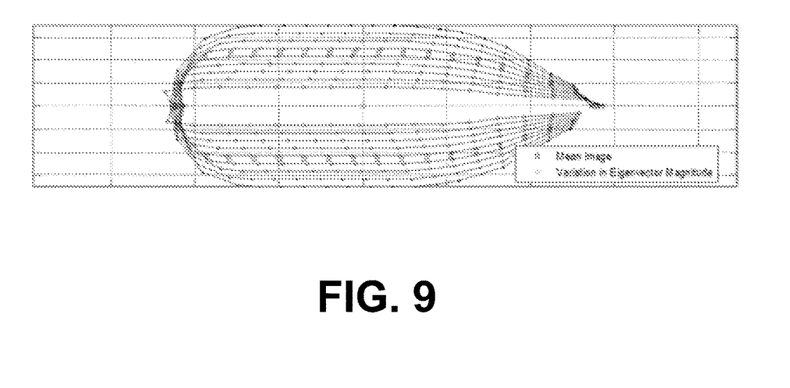
FIG. 9 illustrates a projectile active shape model.

Alternatively, in decision operation 222, when the size of the shape is greater than or equal to the analysis threshold ("YES"), the shape is determined large enough for further processing and processing continues to operation 226. For example, in one embodiment, when the largest candidate shape has an area greater than 3,000 pixels, i.e., an analysis threshold, the shape silhouette is compared to an Active Shape Model (ASM). An ASM is a numerical model used to represent natural shape variability of a training set of similar objects. For artillery projectiles, the training set consists of images of projectiles of varying size, skew angle, and orientation. When the candidate shape is within a threshold distance from the ASM, the pixel locations of that shape are classified as belonging to the projectile. FIG. 9 depicts variations in the first dimension of fluctuation (eigenvector) for the projectile ASM.

In operation 226 the shape is analyzed for a corresponding ASM by fitting. In one embodiment, the segmented shape is fitted to the ASM using the measurement of $\Phi_{obs}$. In one embodiment the nose region of the projectile is defined as the five percent of pixels that are farthest from the central moment of the entire projectile shape. Then, $\Phi_{obs}$ is calculated from the angle between the central moment of the nose region and the central moment of the projectile using Equation 1

$$\Phi_{obs} = \tan^{-1}\left(\frac{\text{Nose}_{moment,y} - \text{Center}_{moment,y}}{\text{Nose}_{moment,x} - \text{Center}_{moment,x}}\right) \quad (1)$$

This results in a robust measurement of $\Phi_{obs}$ which is dependent upon the average of hundreds of pixels as opposed to the precision of just a single pixel as used in other conventional methods such as manual scoring.

In decision operation 228 a determination is made whether the shape is a projectile, i.e., whether the shape fitted an active shape model (ASM). In one embodiment, when a shape did not fit an ASM ("NO"), the process continues to a decision operation 230 where a determination is made whether the frame has been reprocessed a preselected number of times. When the selected video frame has not been processed a preselected number of times ("NO"), processing continues to operation 224, in which the sensitivity is increased, and processing of the video frame is repeated starting again at operation 210.

Alternatively, In decision operation 228, when a shape fit an ASM ("YES"), the process continues to operation 232 in which a sequential stripe pixel history of the image frame is generated. From operation 232 processing continues to decision operation 234 in which a determination is made whether the selected image frame is the last frame in the launch video.

When the selected frame is not the last frame in the launch video ("NO"), processing returns to operation 204, with a next sequential video frame in the launch video is selected for processing in accordance with method 200. Alternatively, when the selected frame is the last frame in the launch video ("YES"), processing ends and method 200 is exited, with processing returning to method 100 and in particular operation 116. Similarly, where launch video 110 was processed in accordance with method 200 in operation 118, when method 200 is exited, processing returns to method 100 and in particular operation 120.

Figure 10:
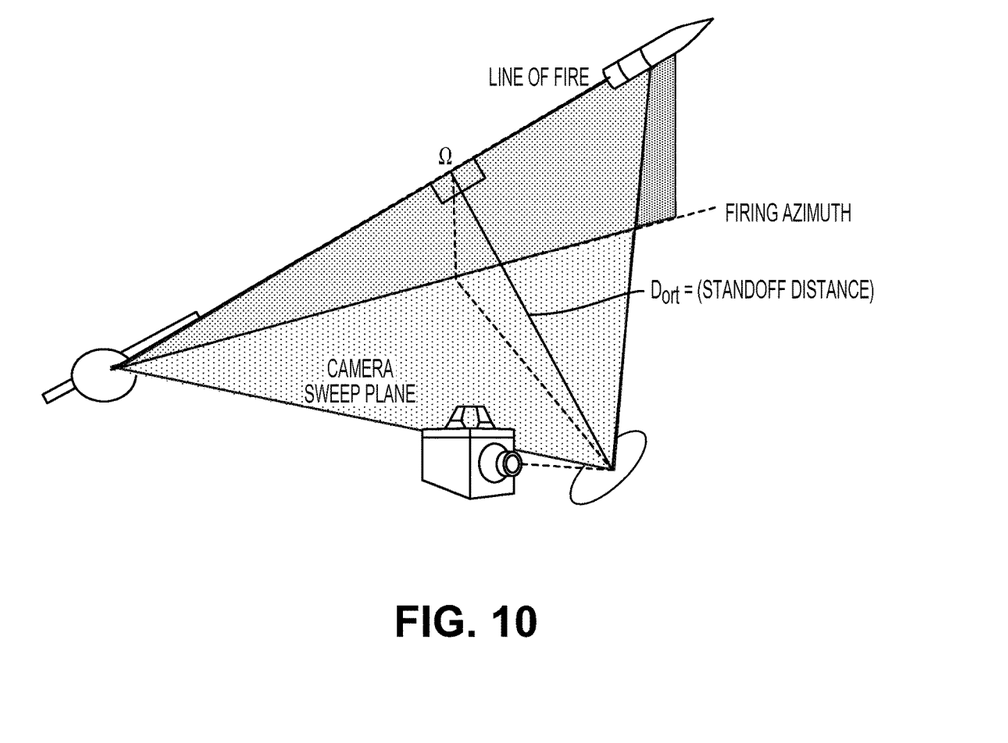
FIG. 10 illustrates a sweep plane profile.

In one embodiment, camera/tracker systems 102, 104 include camera/tracker software that determines various information associated with the system. An a-priori estimate for the projectile muzzle velocity is used as an input by the camera/tracker software to determine a predicted sweep path for the mirror. The simplicity of the geometry in FIG. 10 allows all calculations to be conducted using a coordinate frame centered at the orthogonal point (Ω) and in the camera sweep plane. For each shot, the camera/tracker system software generates a scan output file that contains the time-history of the mirror rotation recorded during the tracking operation. This data is utilized for the velocity and pitching motion analysis of operations 116,118.

The following details are described with reference to the method of operation 116 for ease of description but are equally applicable to operation 120. In operation 116, in one embodiment, initially a velocity analysis is performed. A critical value extracted from the scan output file is the standoff distance ($D_{ort}$) which represents the distance of the camera to the LOF in the sweep plane. When the projectile has reached the orthogonal point (Ω), it is exactly $D_{ort}$ meters from the camera. The number of pixels between the nose and the base of the projectile when it reaches this point ($N_{proj}$) can be used to determine an estimate of the number of radians per image pixel (K) for the entire launch video using Equation 2

$$K = 2N_{proj}^{-1} \tan^{-1}(0.5LD_{ort}^{-1}) \quad (2)$$

where L is the actual projectile length. The number of radians per pixel is required for correcting the position and velocity estimates.

The corrected angular position of the projectile is calculated using Equations 3 and 4

$$\Psi_x = \Psi_{centerpixel,x} + \Psi_{correction,x}, \ \Psi_{correction,x} = K(\text{Center}_{moment,x} - 0.5N_{cols}) \quad (3)$$

$$\Psi_y = K(\text{Center}_{moment,y} - 0.5N_{rows}) \quad (4)$$

where the rotation of the center pixel ($\Psi_{centerpixel,x}$) is taken from the scan output file, and $N_{cols}$ and $N_{rows}$ refer to the image resolution (usually 1024×512).

Using these corrections for the projectile viewing skew angle history, the velocities in the horizontal (X) and vertical (Y) directions are determined from $$V_x = D_{ort}\frac{\Delta(\sec^2(\Psi_x))}{\Delta t}, V_y = D_{ort}\frac{\Delta(\sec^2(\Psi_y))}{\Delta t} \quad (5)$$

and the velocity angle history ($\Phi_V$) in the image frame becomes $$\Phi_V = \tan^{-1}(V_y V_x^{-1}) \quad (6)$$

A linear fit to the $\Phi_V$ is computed for each shot to be used in correcting the pitch angle of the projectile.

Figure 11:
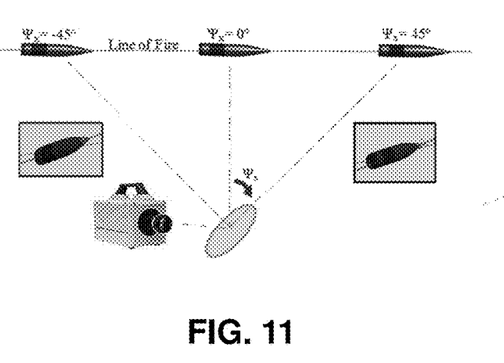
FIG. 11 illustrates observed pitch angle corrections.
Figure 12:
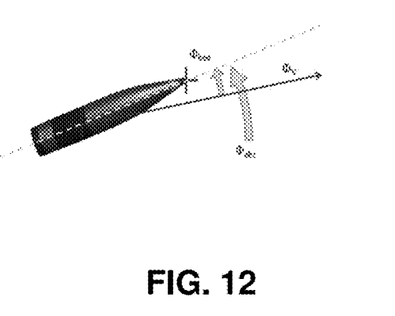
FIG. 12 illustrates observed pitch angle corrections.

The value of $\Phi_{obs}$ calculated in the segmentation process is a measure of the projectile's apparent pitch angle in the image frame. When the line of fire (LOF) is not parallel to the image frame (when $\Psi_x \neq 0$) the calculated $\Phi_{obs}$ value is an over-estimate of the actual pitch angle because the projectile appears shorter as illustrated in FIGS. 11 and 12. If a projectile was a two-dimensional (2D) body, then the pitch angle correction for the skew angle is $$\Phi' = \Phi_{obs}\cos(\Psi_x) \quad (7)$$

The accuracy of the simple trigonometric correction in Eq. (7) was evaluated using Computer Aided Design (CAD) software. A 3D model of a 155 mm-type projectile was oriented to a pitch angle of 10°. Screenshot images were taken at different viewing skew angles ($\Psi_x$) ranging from −50° to 50°. The process was repeated for a pitch angle of 5°. Results showed that the segmentation and pitch measurement algorithm with the correction in Eq. (7) was accurate to within 0.0095° per degree. To improve this result even further, the empirical relationship, accurate for both pitch angles to within 0.0001° per degree for all skew angles in the test set, is established as $$\Phi' = \Phi_{obs}(\cos(\Psi_x) + 0.0114|\Psi_x|) \quad (8)$$

These error estimates may not directly correlate to the accuracy of the segmentation algorithm for real projectile video. The resolution of the CAD projectile images provided just over 200 pixels along the axis of the projectile. This number is actually smaller than most frames in a typical launch video, suggesting that the performance could actually be better from real video. The real video, however, may be subject to increased noise, occlusion, glint, and decreased contrast with the background which may hinder the ability of the algorithm to segment the projectile as accurately as it does for the CAD images.

A final correction must also be made because the true pitch angle is measured relative to the velocity vector of the projectile, not the arbitrary horizontal axis of the image frame. A best estimate for the pitch angle relative to the velocity vector in each video frame is computed as $$\Phi_{best} = \Phi' - \Phi_V\cos(\Psi_x) \quad (9)$$

The corrections of operation 116 are applied to the pitch history of operation 114 to generate a resultant corrected pitch history. The corrected pitch histories resulting from operations 116 and 120 are then input to operation 124 in which data obtained from both camera/tracker systems are used to estimate the true pitch and yaw of the projectile.

Figure 13:
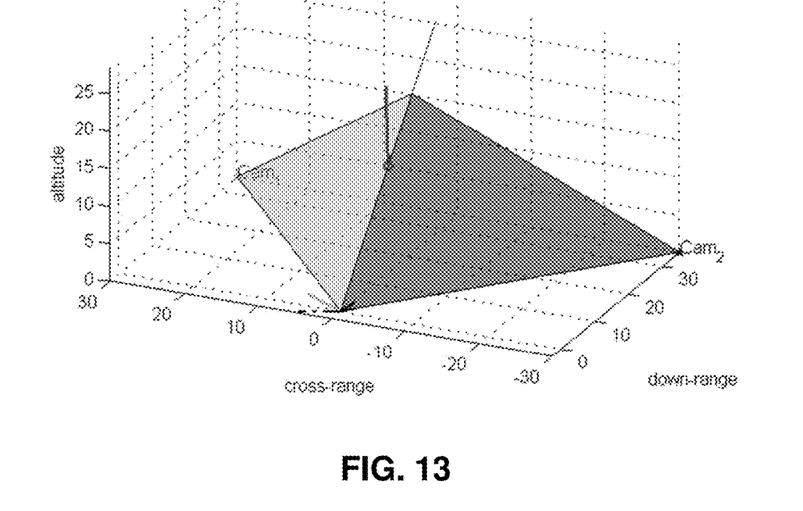
FIG. 13 illustrates launch geometry of quadrant elevation (QE)=45 degrees (800 mils).

The pitch value estimated at this point ($\Phi_{best}$) is only representative of the pitching motion relative to the velocity vector in the plane that contains the LOF and is perpendicular to the camera location. In order to estimate the conventional pitch ($\alpha$) and yaw ($\beta$) of the projectile in 3D (referred to as angle of attack and side-slip angle in flight mechanics) it is necessary to use two camera/tracker systems located at different positions. To reduce geometric dilution of precision while optimizing the range in which the bullet remains in view, it has been found that locating the cameras about 40 m downrange, and placed 35 m away from the azimuth of fire works well for analyzing 155 mm projectiles at a quadrant elevation of 800 mils (45°) as shown in FIG. 13.

In operation 124, the algorithm to merge the pitch and yaw analysis from opposing cameras 102/104 begins by taking the pitching motion history ($\Phi_{best}$) and the position estimates from the video analysis of each camera/tracker system 102, 104, i.e., the corrected pitch histories, together with the geodetics of the gun and camera geometry 122. The position history estimate from each camera 102,104 is averaged for all frames and assumed to be located along the line of fire. In each time increment where the projectile was successfully segmented by both cameras, the camera view plane along the LOF and the pointing vector from the projectile location to each camera is calculated as $$\vec{N} = \vec{S}_{LoF} \times Cam_{XYZ}, \vec{r} = s_{proj}\vec{S}_{LoF} - Cam_{XYZ} \quad (10)$$

Here $S_{LOF}$ is the pointing direction of the line of fire, $s_{proj}$ is the downrange distance of the projectile along the line of fire from the position estimate, $Cam_{XYZ}$ is the position of the camera relative to the cannon trunnion using a coordinate system (where the X direction points horizontally down the azimuth of fire, Y points in the crossrange direction, and the Z direction is up). The projectile pointing vector in the camera view plane in XYZ coordinates is then calculated as $$\vec{n}_{rot} = {}_{camera}^{XYZ}R\vec{N} \quad (11)$$

where the rotation matrix ${}_{camera}^{XYZ}R$ is constructed using a quaternion $$Q = [\cos(0.5\Phi_{best})\vec{r}_X \sin(0.5\Phi_{best})\vec{r}_Y \sin(0.5\Phi_{best})\vec{r}_Z \\ \sin(0.5\Phi_{best})] \quad (12)$$

Finally, the attitude vector of the projectile in found according to $$\vec{t}_{XYZ} = \vec{n}_{left,rot} \times \vec{n}_{right,rot} \quad (13)$$

where the subscripts left and right represent the left and right cameras. The true pitch and true yaw values relative to the line of fire are calculated utilizing the corresponding rotation by a QE angle ${}_{XYZ}^{LOS}R$ $$\alpha = \tan^{-1}(i_3/i_1), \beta = \tan^{-1}(i_2/i_1), \vec{t}_{123} = {}_{XYZ}^{LOS}R\vec{t}_{XYZ}, \quad (14)$$

These pitch and yaw results for the projectile are then output from operation 124 and method 100 is exited.

In some embodiments, the epicyclic motion of the projectile can also be characterized. In free flight, the nose of a projectile gyrates or "cones" around its velocity vector at two distinct frequencies. The slower of these frequencies is known as precession and the faster frequency is known as nutation. In the short amount of travel captured by the launch video, only 1-2 nutation cycles are measured.

In one embodiment, a three step procedure for quantifying the epicyclic motion assuming linearized aeroballistics is as follows.

1. Subtract the average value for the pitching motion ($\alpha$) from each of the history points calculated, and find a least-squares fit to a single sinusoid featuring a first estimate for the fast frequency ($\omega_f$) and its corresponding phase shift ($\phi_f$)

$$\alpha_{zero\_mean} = \lambda_f \sin(\omega_f t + \phi_f) \quad (15)$$

2. Assume that velocity (V) and spin rate (p) are constant during the segment of flight recorded in the video. The projectile spin rate is calculated by taking the average velocity calculated in the automated velocity analysis and converting it to spin rate $$p = 2\pi \bar{V}(N_{twist} d_{proj})^{-1} \text{ [rad/sec]} \quad (16)$$

where $d_{proj}$ is the projectile diameter and $N_{twist}$ is the twist rate of the cannon rifling (for U.S. 155 mm cannons $N_{twist}$=1 rev/20 cal).

For axially symmetric spinning projectiles, the relative rates of the fast and slow modes of oscillation are related by the spin rate through the ballistic parameter P $$P = I_x I_y^{-1} p, \quad \omega s = P - \omega_f \quad (17)$$

where $I_x$ and $I_y$ are the axial and transverse moments of inertia of the projectile, respectively.

Using the $\omega_f$, $\lambda_f$, and the $\phi_f$ calculated in step 1, a second least-squares fit is performed to determine an estimate for $\lambda_s$, and the $\phi_s$ $$\alpha_{true} = \lambda_f \sin(\omega_f t + \phi_f) + \lambda_s \sin((P - \omega_f) t + \phi_s) \quad (18)$$

3. Perform a final least-squares fit allowing all variables in Eq. (18) to adjust to compute the best estimate for the pitching motion. If the epicyclic motion has been correctly identified, then step three can be repeated to fit the yaw-direction data ($\beta_{true}$) by changing only the phase shifts ($\phi_s$ and $\phi_f$) as shown in the following section.

Having quantified the epicyclic motion, important aeroballistic information can be determined about the projectile flight. The first value of interest is the ballistic parameter M, which is calculated from $$M = 0.25(P^2 - (2\omega_f - P)^2) \quad (19)$$

From the parameter M, the linearized pitch damping coefficient, $C_{m\alpha}$ is found as $$C_{m\alpha} = 2 m_{proj} (\rho_{air} S_{proj} d_{proj})^{-1} k_y^2 M, \quad k_y^2 = I_y (d_{proj}^2 m_{proj})^{-1} \quad (20)$$

The ratio of these parameters can be used to quantify the gyroscopic stability of the projectile for the given launch velocity $$S_g = 0.25 P^2 M^{-1} \quad (21)$$

In testing of the automated method to quantify epicyclic motion, a virtual launch video was generated from a 3D CAD model of an M795 155 mm projectile. The coloring, lighting, and frame rate (10,000 fps) were set to match conditions observed in real launch videos. The commanded motion exhibited roughly 2½ nutation cycles and ½ of a precession cycle in the 1,000 frame video which lasted 3.5 sec (comparable to the cycles observed in a real 0.1 sec launch video).

Figure 14:
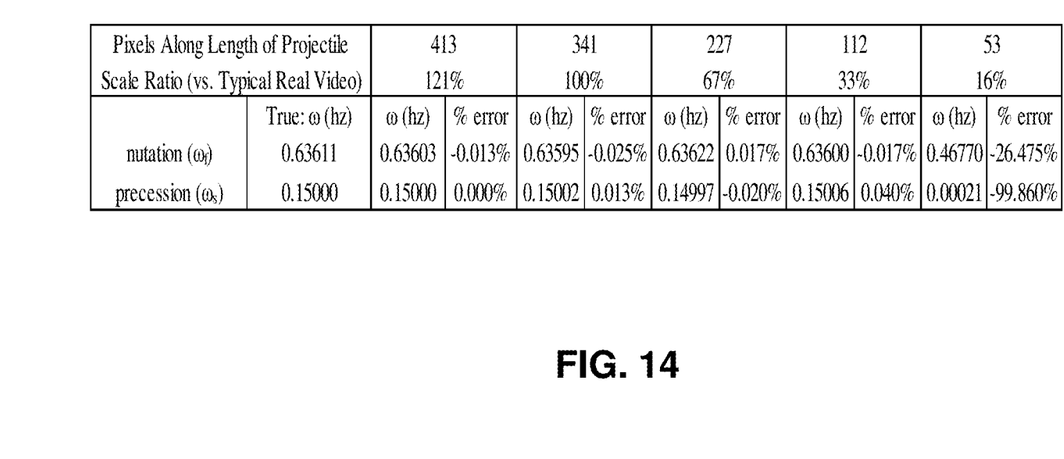
FIG. 14 illustrates a table showing verification study results at different resolutions in accordance with one embodiment of the invention.

Several different resolutions were investigated. Estimated values for the oscillation frequencies were calculated to within 0.05% error for pixel resolutions higher better than 112 pixels along the length of the projectile. Errors were significant at lower resolutions where there were only 53 pixels along the projectile length, which may indicate a lower bound of the algorithm. In one instance, the video analysis and post-processing required 55 seconds. The results of this verification study are shown in FIG. 14.

An artillery test of M795 155 mm projectiles was conducted in which two camera/tracker systems were employed to evaluate the proposed method. Over 800 videos were recorded and analyzed. The average computation time was less than 4 minutes for each round (videos recorded at 2,000 fps). The average velocity calculated during this shot was 765.5 m/s. A sample of the output results from one of those rounds is shown in FIGS. 15-17.

Figure 15:
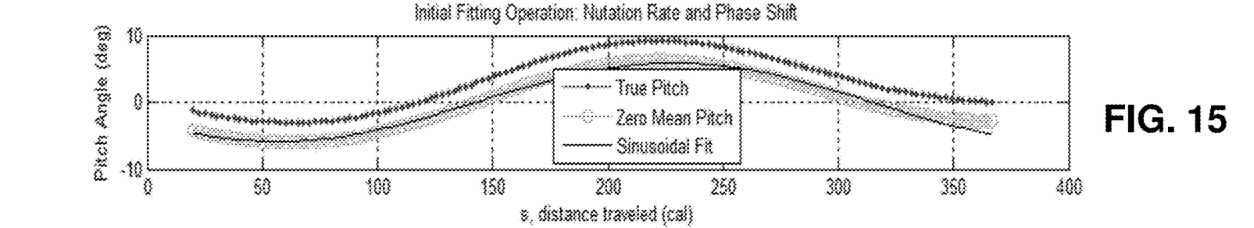
FIG. 15 illustrates an initial fitting operation: nutation rate and phase shift in automatic quantification of epicyclic motion in accordance with one embodiment of the invention.
Figure 16:
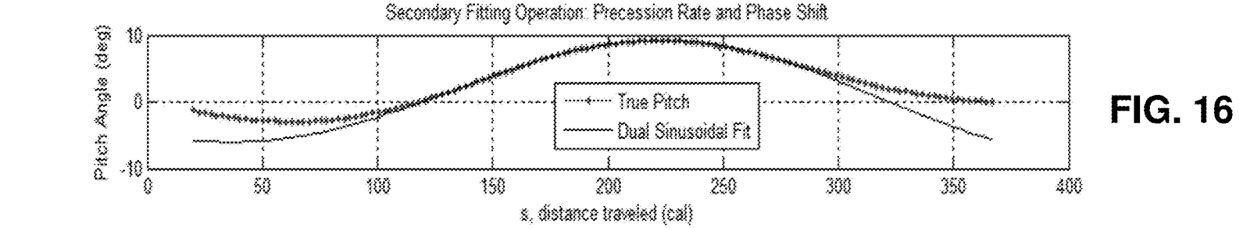
FIG. 16 illustrates a secondary fitting operation: precession rate and phase shift in automatic quantification of epicyclic motion in accordance with one embodiment of the invention.
Figure 17:
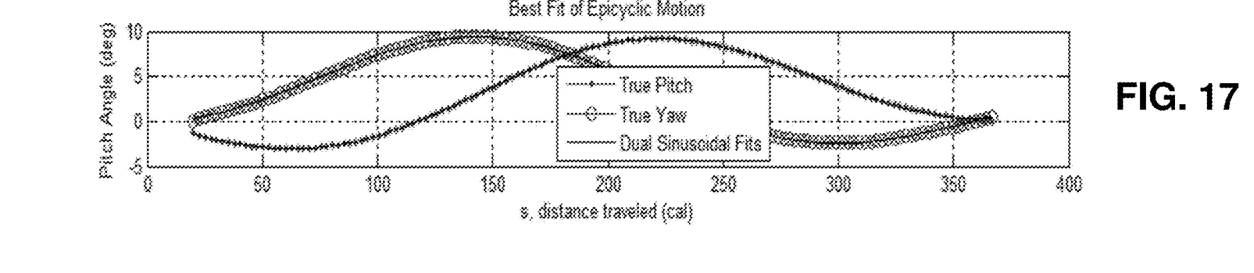
FIG. 17 illustrates a resultant best fit of epicyclic motion in accordance with one embodiment of the invention.

As expected, the pitch angle measured by each camera in FIGS. 15-17 begins near zero as the bullet leaves muzzle of the cannon, and then exhibits smoothly fluctuating sinusoidal motion. After converting the estimates from each camera to describe true pitch ($\alpha$) and true yaw ($\beta$), the pointing history is plotted on the right side of FIG. 15-17 in the convention of Carlucci. The history shows one entire clockwise nutation cycle and also gives an indication of the clockwise precessing motion.

Figure 18:
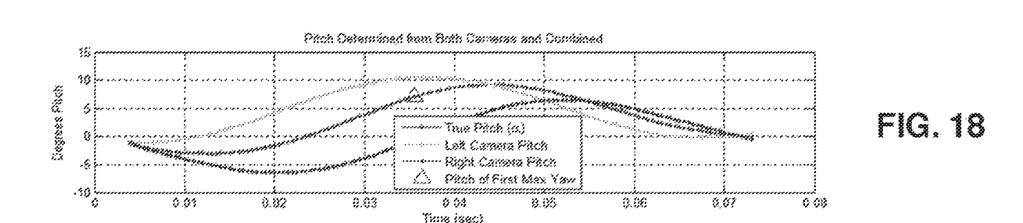
FIG. 18 illustrates pitch determined from both cameras and combined in accordance with one embodiment of the invention.
Figure 19:
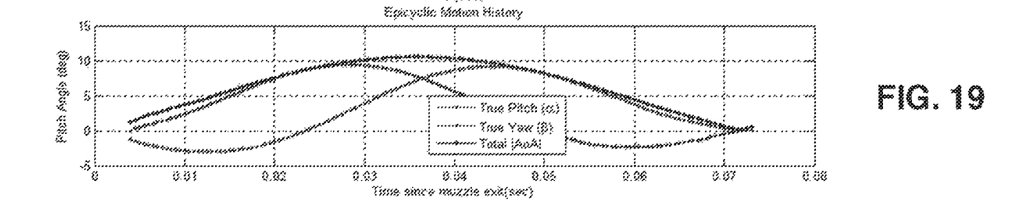
FIG. 19 illustrates epicyclic motion history in accordance with one embodiment of the invention.
Figure 20:
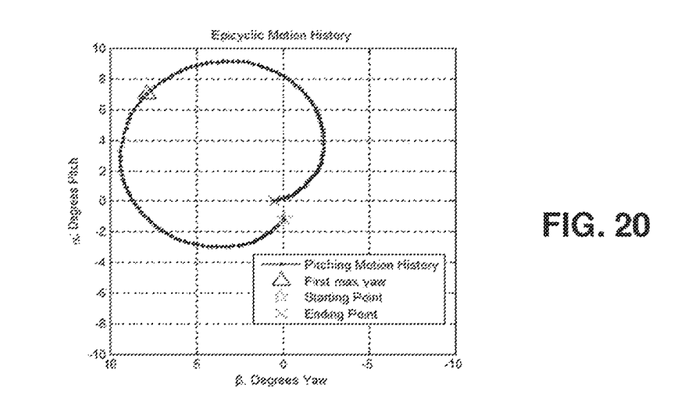
FIG. 20 illustrates epicyclic motion history degrees yaw in accordance with one embodiment of the invention.

FIGS. 18-20 illustrate the results of the automated epicyclic motion calculation for the round analyzed in FIG. 15-16. The estimated oscillation frequency values for the round in FIGS. 18-20 were 17.6 Hz and 4.9 Hz for the nutation and precession rates, respectively. These values are higher than expected, but within the bounds of simulation estimates for the M795 projectile with a spatial angle of attack ($\alpha_{sp} = \sqrt{\alpha^2 + \beta^2}$) larger than 5° and occurring in the transonic region Stationary pitch and yaw cameras were also employed during this test. The cameras were oriented to measure the FMY, which was expected to occur around 25 m beyond the muzzle of the cannon. Manual data reduction on the pitch and yaw cameras was received two weeks after the completion of the test. The FMY value determined from the pitch and yaw camera analysis differed from the spatial angle of attack at 25 m measured by the automated method by an average of 0.64° with a standard deviation of 0.55°. These values happen to be within the error bounds of the manual pitch and yaw camera analysis method.

Embodiments in accordance with the invention utilize two camera/tracker systems. The method does not function correctly if the projectile does not remain in view or if the size of the projectile resolution falls below one hundred and twelve pixels along the length of the bullet. Performance is degraded by poor focus of the image and by glint from the sun. In a few cases studied, the image of the projectile disappeared for several frames when the sun was in the background. Horizontal firings where objects appear in the background significantly hinder the segmentation algorithm. There may also be time delay problems between the two camera/tracker systems, or between the time recorded on each frame and the time recorded by the mirror rotation encoder. This would affect how the code is able to synchronize the data streams and compute the attitude vector in 3D.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method and apparatus for computer vision analysis of video taken of a marked projectile launched from a gun, the method comprising:
   receiving a first projectile launch video recording of a marked projectile launched from a gun generated by a first video camera system, said first projectile launch video having a plurality of first image frames, at least a portion of said plurality of first image frames containing a projectile shape corresponding with said marked projectile;
   receiving a second projectile launch video recording of said marked projectile launched from said gun generated by a second video camera system, said second video camera system being positioned at a different location from said first video camera system, said second projectile launch video having a plurality of second image frames, at least a portion of said plurality of second image frames containing a projectile shape corresponding with said marked projectile;

segmenting a projectile shape, if any, in each of said first image frames of said plurality of first image frames, and generating a first pitch history;

segmenting a projectile shape, if any, in each of said second image frames of said plurality of second image frames, and generating a second pitch history;

receiving first mirror rotation data corresponding with said first projectile launch video recording, correcting said first pitch history for skew angle and camera misalignment, and generating a first corrected pitch history;

receiving second mirror rotation data corresponding with said second projectile launch video recording, correcting said second pitch history for skew angle and camera misalignment, and generating a second corrected pitch history;

receiving said first corrected pitch history and said second corrected pitch history and geodetic information associated with the location geometry of said first video camera system, said second video camera system, and said gun, and determining the pitch and the yaw of said projectile based on said first corrected pitch history, said second corrected pitch history, and said geodetic information; and outputting said pitch and said yaw of said projectile.

2. The method of claim 1 further comprising:

determining an epicyclic motion of said projectile.

* * * * *